US011850811B1

(12) United States Patent
Jenkins et al.

(10) Patent No.: US 11,850,811 B1
(45) Date of Patent: Dec. 26, 2023

(54) MONOLITHIC COMPOUND LENS

(71) Applicant: Meta Platforms Technologies, LLC, Menlo Park, CA (US)

(72) Inventors: Kurt Allen Jenkins, Sammamish, WA (US); Chad Lichtenhan, Issaquah, WA (US); Michael Patrick Schaub, Redmond, WA (US); Byron Taylor, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 899 days.

(21) Appl. No.: 16/696,934

(22) Filed: Nov. 26, 2019

Related U.S. Application Data

(60) Provisional application No. 62/862,888, filed on Jun. 18, 2019.

(51) Int. Cl.
*B29D 11/00* (2006.01)
*G02B 13/00* (2006.01)
(Continued)

(52) U.S. Cl.
CPC .... *B29D 11/00403* (2013.01); *B29C 35/0805* (2013.01); *B29D 11/00442* (2013.01);
(Continued)

(58) Field of Classification Search
CPC ........ B29D 11/00403; B29D 11/00009; B29D 11/00413; B29D 11/0048;
(Continued)

(56) References Cited

U.S. PATENT DOCUMENTS 3,971,841 A 7/1976 Rubinstein
8,432,625 B2 4/2013 Duparre et al.
(Continued)

FOREIGN PATENT DOCUMENTS

CN 104142552 A 11/2014
CN 104204886 A 12/2014
(Continued)

OTHER PUBLICATIONS

Non-Final Office Action dated Jul. 14, 2022 for U.S. Appl. No. 16/695,915, filed Nov. 26, 2019, 10 pages.
(Continued)

*Primary Examiner* — Philip C Tucker
*Assistant Examiner* — Jimmy R Smith, Jr.
(74) *Attorney, Agent, or Firm* — FREESTONE INTELLECTUAL PROPERTY LAW PLLC; Aaron J. Visbeek

(57) ABSTRACT

A method of fabricating a lens includes dispensing a first liquid optically-transmissive material into a first mold cavity and then curing the first liquid optically-transmissive material to form a first region the lens having a first refractive index and an optical interface surface. A second liquid optically-transmissive material then dispensed into a second mold cavity over the optical interface surface while the first region of the lens is disposed within the second mold cavity. The second liquid optically-transmissive material in the second mold cavity is cured to form a second region of the lens having a second refractive index. An optical interface between the first region and the second region conforms to the optical interface surface.

14 Claims, 9 Drawing Sheets

(51) Int. Cl.
   G02B 27/01    (2006.01)
   B29C 35/08    (2006.01)
(52) U.S. Cl.
   CPC ....... G02B 13/006 (2013.01); G02B 27/0172 (2013.01); *B29C 2035/0827* (2013.01)
(58) Field of Classification Search
   CPC .......... B29D 11/00567; B29D 11/0049; B29D 11/005; B29D 11/00519; B29D 11/00528; B29D 11/00538; B29D 11/00548; B29D 11/00557; B29D 11/00576; B29D 11/00586; B29D 11/00509; B29D 11/00442; B29D 11/00461; B29L 2011/0016; G02B 1/041
   See application file for complete search history.

(56) References Cited

U.S. PATENT DOCUMENTS

| | | |
|---|---|---|
| 2006/0284327 A1 | 12/2006 | Yamamichi |
| 2009/0201594 A1 | 8/2009 | Smith |
| 2009/0304337 A1 | 12/2009 | Sato |
| 2010/0073531 A1 | 3/2010 | Yano et al. |
| 2011/0042840 A1 | 2/2011 | Okazaki et al. |
| 2011/0194089 A1 | 8/2011 | Sigel et al. |
| 2011/0242671 A1 | 10/2011 | Jibu et al. |
| 2013/0037976 A1 | 2/2013 | Hayashida et al. |
| 2013/0206323 A1 | 8/2013 | Blackburn et al. |
| 2013/0242110 A1 | 9/2013 | Terre et al. |
| 2013/0300009 A1* | 11/2013 | Oganesian ....... B29D 11/00442 264/1.38 |
| 2013/0323483 A1 | 12/2013 | Otsuka et al. |
| 2014/0016215 A1 | 1/2014 | Akutsu et al. |
| 2014/0043320 A1 | 2/2014 | Tosaya et al. |
| 2014/0253995 A1 | 9/2014 | Ohhashi et al. |
| 2014/0347752 A1 | 11/2014 | Koike et al. |
| 2015/0158259 A1* | 6/2015 | Yamamoto ....... B29D 11/00403 264/1.32 |
| 2015/0286038 A1 | 10/2015 | Finegold et al. |
| 2016/0332348 A1 | 11/2016 | Bae |
| 2016/0379054 A1 | 12/2016 | Sicari et al. |
| 2018/0164533 A1 | 6/2018 | Qiu |
| 2018/0307362 A1 | 10/2018 | Komala et al. |
| 2018/0318066 A1 | 11/2018 | Campin et al. |
| 2019/0210154 A1 | 7/2019 | Wang |

FOREIGN PATENT DOCUMENTS

| | | |
|---|---|---|
| CN | 206339783 U | 7/2017 |
| GB | 739493 A | 11/1955 |
| JP | S6084515 A | 5/1985 |
| JP | H03167514 A | 7/1991 |
| JP | 2004109710 A | 4/2004 |

OTHER PUBLICATIONS

Office Action dated Aug. 2, 2022 for Chinese Application No. 202080034657.3, filed Jun. 3, 2020, 18 pages.
Final Office Action dated Oct. 28, 2022 for U.S. Appl. No. 16/695,915, filed Nov. 26, 2019, 11 pages.
Non-Final Office Action dated Sep. 2, 2022 for U.S. Appl. No. 16/734,155, filed Jan. 3, 2020, 8 pages.
International Search Report and Written Opinion for International Application No. PCT/US2020/036010, dated Nov. 2, 2020, 14 Pages.
Invitation to Pay Additional Fees for International Application No. PCT/US2020/036010, mailed Sep. 11, 2020, 12 Pages.
Rhcastihos, et al., "File: Schematic Diagram of the Human Eye En.Svg," From Wikipedia, the Free Encyclopedia [online], Jan. 25, 2007 [Retrieved on Oct. 15, 2020], 10 Pages, Retrieved from the Internet: URL: https://en.wikipedia.Org/wiki/Human_eye#/media/File:Schematic_diagram_of_the_human_eye_en.svg.
Final Office Action dated May 5, 2023 for U.S. Appl. No. 16/689,558, filed Nov. 20, 2019, 14 pages.
Final Office Action dated Mar. 2, 2023 for U.S. Appl. No. 16/734,155, filed Jan. 3, 2020, 9 pages.
Non-Final Office Action dated Mar. 1, 2023 for U.S. Appl. No. 16/735,400, filed Jan. 6, 2020, 10 pages.
Final Office Action dated Dec. 14, 2022 for U.S. Appl. No. 16/735,400, filed Jan. 6, 2020, 10 pages.
Machine Translation of JPH03167514A, 1991, 3 pages.
Non-Final Office Action dated Dec. 21, 2022 for U.S. Appl. No. 16/689,558, filed Nov. 20, 2019, 11 pages.
Office Action dated Feb. 24, 2023 for Chinese Application No. 202080034657.3, filed Jun. 3, 2020, 14 pages.

* cited by examiner

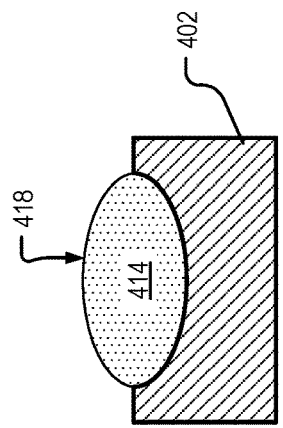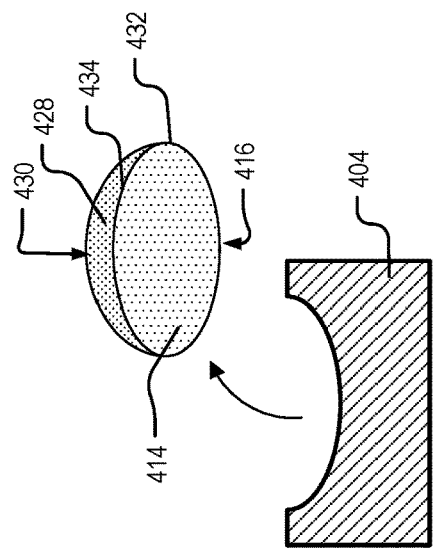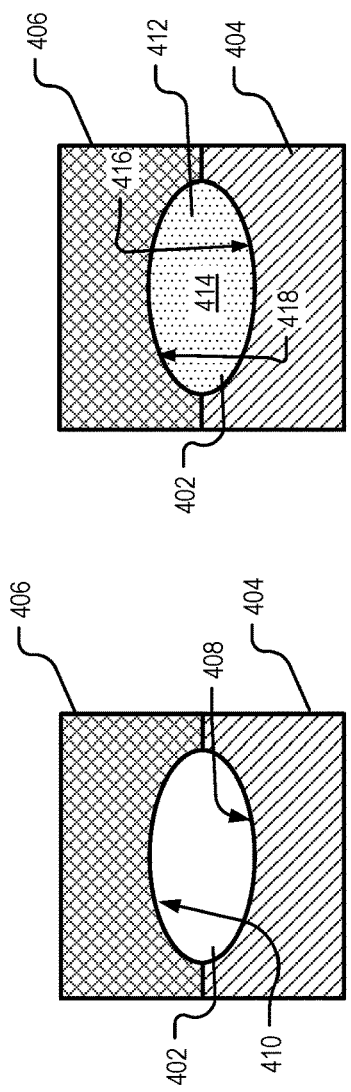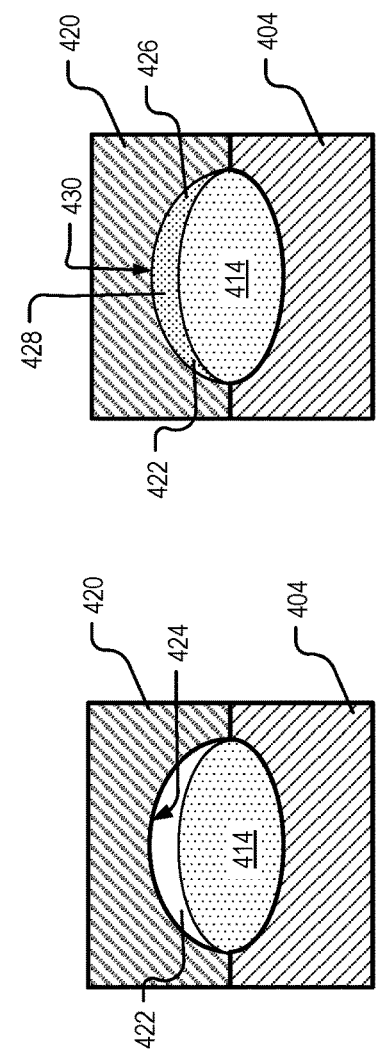
FIG. 4A  FIG. 4B  FIG. 4C  FIG. 4D  FIG. 4E  FIG. 4F

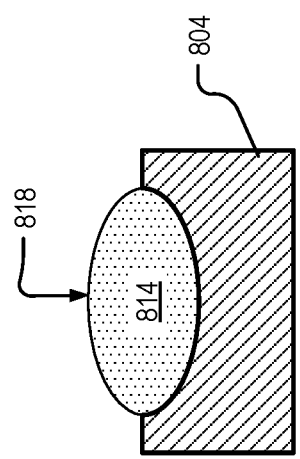
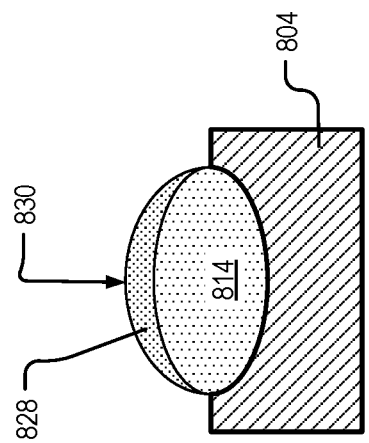
FIG. 8C
FIG. 8F
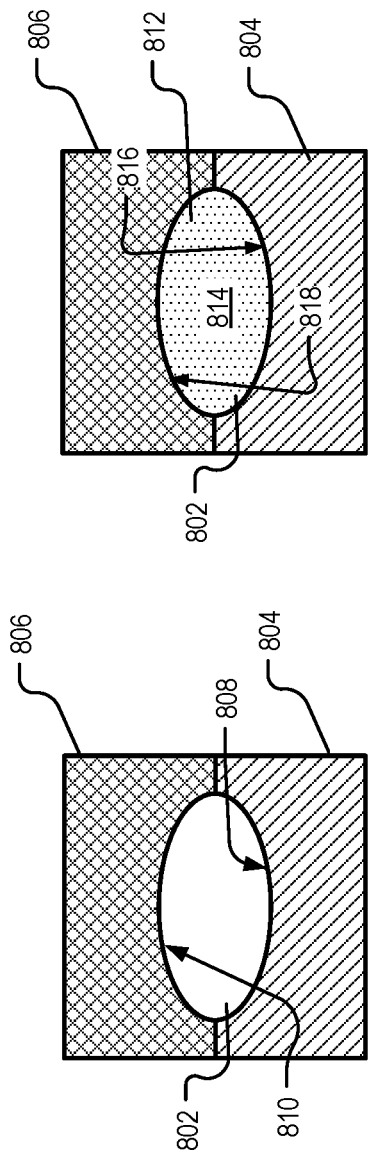
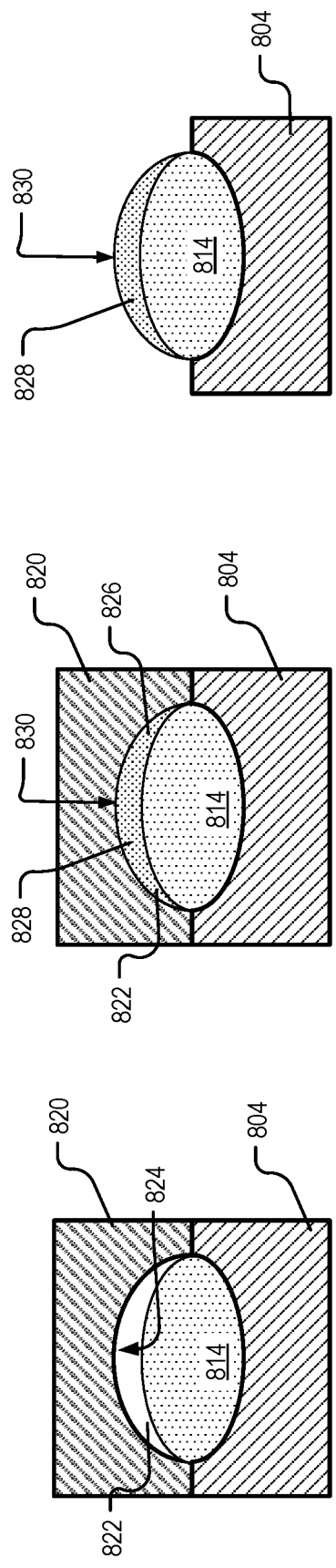
FIG. 8B
FIG. 8E
FIG. 8A
FIG. 8D

MONOLITHIC COMPOUND LENS

CROSS-REFERENCE TO RELATED APPLICATION

The present Application claims the benefit of U.S. Provisional Application No. 62/862,888, entitled "Lens Manufacturing and Assembly" filed Jun. 18, 2019. U.S. Provisional Application No. 62/862,888 is expressly incorporated herein by reference in its entirety.

FIELD OF DISCLOSURE

Aspects of the present disclosure relate generally to lenses, and in particular but not exclusively, relate to compound lenses.

BACKGROUND

A smart device is an electronic device that typically communicates with other devices or networks. In some situations the smart device may be configured to operate interactively with a user. A smart device may be designed to support a variety of form factors, such as a head mounted device, a head mounted display (HMD), or a smart display, just to name a few.

Smart devices may include one or more electronic components for use in a variety of applications, such as gaming, aviation, engineering, medicine, entertainment, video/audio chat, activity tracking, and so on. For example, a smart device may include an electronic display for generating image light, a camera for capturing images of the user and/or environment, and/or a light emitting device for illuminating the user and/or environment. Thus, a smart device may also include one or more optical assemblies for use in conjunction with the electronic component. Such optical assemblies may include a variety of optical elements, such as lenses, polarizers, waveguides, reflectors, waveplates, etc., that are configured to pass, direct, filter, and/or focus light to or from the electronic component.

The size requirements of the various optical assemblies may be dependent on the particular application. Thus, as the need for the miniaturization and/or accuracy of the smart device increases, the need for the miniaturization and accuracy of the various optical assemblies also increases.

BRIEF DESCRIPTION OF THE DRAWINGS

Non-limiting and non-exhaustive aspects of the present disclosure are described with reference to the following figures, wherein like reference numerals refer to like parts throughout the various views unless otherwise specified.

FIGS. 4A-4F illustrate an example implementation of the process of FIG. 3.

FIGS. 8A-8I illustrate an example implementation of the process of FIG. 7.

DETAILED DESCRIPTION

Various aspects and embodiments are disclosed in the following description and related drawings to show specific examples relating to a monolithic compound lens. Alternate aspects and embodiments will be apparent to those skilled in the pertinent art upon reading this disclosure and may be constructed and practiced without departing from the scope or spirit of the disclosure. Additionally, well-known elements will not be described in detail or may be omitted so as to not obscure the relevant details of the aspects and embodiments disclosed herein.

Figure 1:
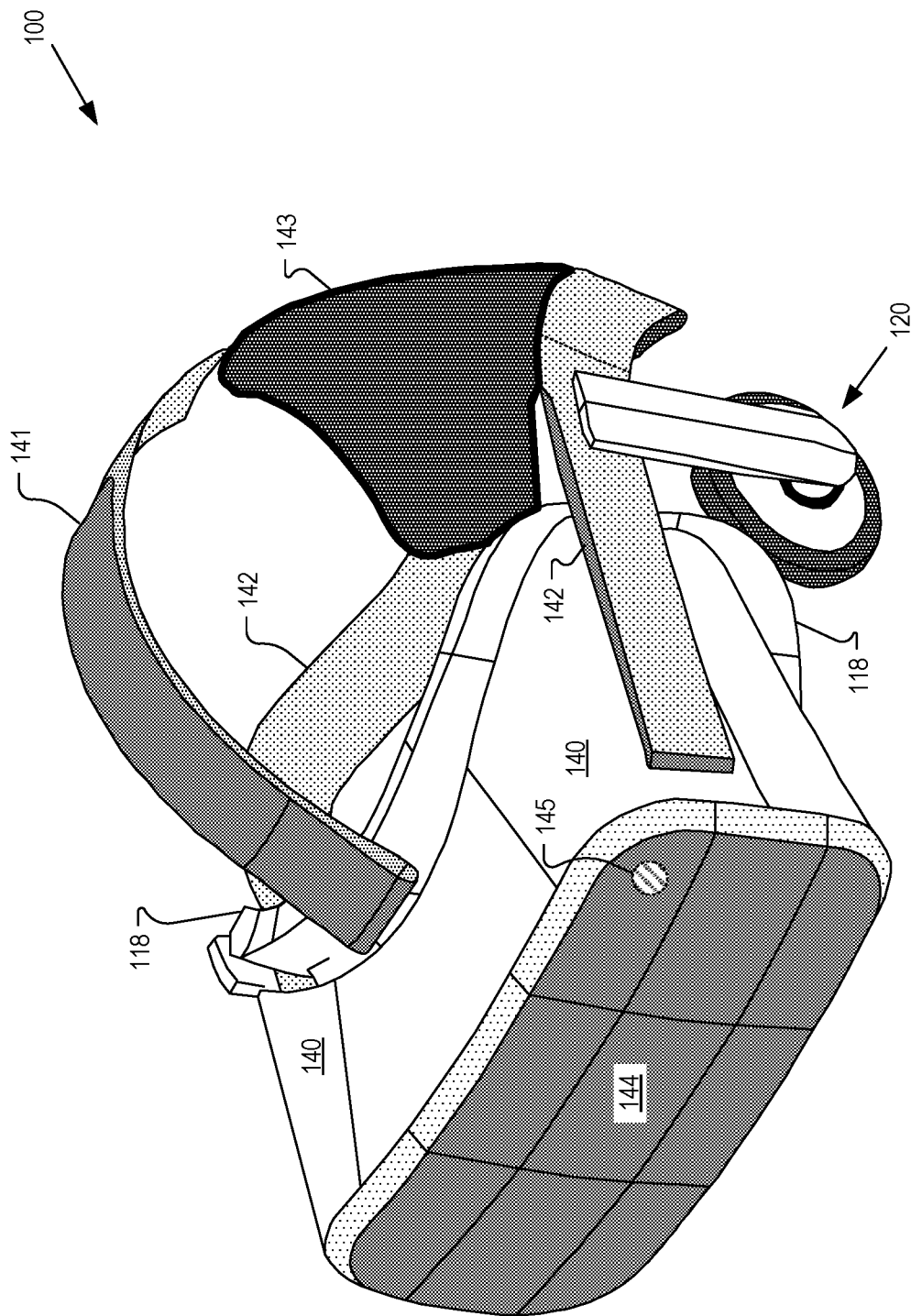
FIG. 1 illustrates a head mounted display (HMD), in accordance with aspects of the present disclosure.

FIG. 1 illustrates a head-mounted display (HMD) 100, in accordance with aspects of the present disclosure. An HMD, such as HMD 100, is one type of smart device, typically worn on the head of a user to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof. The illustrated example of HMD 100 is shown as including a viewing structure 140, a top securing structure 141, a side securing structure 142, a rear securing structure 143, and a front rigid body 144. In some examples, the HMD 100 is configured to be worn on a head of a user of the HMD 100, where the top securing structure 141, side securing structure 142, and/or rear securing structure 143 may include a fabric strap including elastic as well as one or more rigid structures (e.g., plastic) for securing the HMD 100 to the head of the user. HMD 100 may also optionally include one or more earpieces 120 for delivering audio to the ear(s) of the user of the HMD 100.

The illustrated example of HMD 100 also includes an interface membrane 118 for contacting a face of the user of the HMD 100, where the interface membrane 118 functions to block out at least some ambient light from reaching to the eyes of the user of the HMD 100.

Example HMD 100 may also include a chassis for supporting hardware of the viewing structure 140 of HMD 100 (chassis and hardware not explicitly illustrated in FIG. 1). The hardware of viewing structure 140 may include any of processing logic, wired and/or wireless data interface for sending and receiving data, graphic processors, and one or more memories for storing data and computer-executable instructions. In one example, viewing structure 140 may be configured to receive wired power and/or may be configured to be powered by one or more batteries. In addition, viewing structure 140 may be configured to receive wired and/or wireless data including video data.

Viewing structure 140 may include a display system having one or more electronic components, such as electronic displays for directing light to the eye(s) of a user of HMD 100. The display system may include one or more of a liquid crystal display (LCD), an organic light emitting diode (OLED) display, a micro-LED display, etc. for emitting light (e.g., content, images, video, etc.) to a user of HMD 100. The viewing structure 140 may also include an optical assembly that is configured to receive the image light from the display system and generate a virtual image (e.g., by collimating the image light) for viewing by an eye of a wearer of the HMD 100. In some embodiments, the optical assembly included in the viewing structure 140 may include a variety of near-eye optical elements, such as one or more of a lens, a polarizer, a waveguide, a reflector, a waveplate, and so on. In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In some examples, an electronic component 145 may be included in viewing structure 140. In some aspects, the electronic component 145 is a camera or image sensor for capturing image(s) of an eye of a user of HMD 100 for eye-tracking operations. In other aspects, the electronic component 145 is a Simultaneous Localization and Mapping (SLAM) sensor, such as an optical sensor, rangefinder, LiDAR sensor, sonar sensor, etc., for mapping the user and/or environment surrounding the HMD 100. In other examples, electronic component 145 may be a laser or other light-emitting device.

In some aspects, the electronic component 145 may be mated with an optical assembly that includes one or more small-diameter optical elements, such as a lens, a polarizer, a waveguide, reflector, a waveplate, etc. In some aspects, a "small-diameter" optical element refers to an optical element having a diameter (e.g., aperture) that is 3 millimeters or less.

As mentioned above, as the requirements for the miniaturization and/or accuracy of the various systems (e.g., eye-tracking system or viewing structure) of a smart device increases, so too does the need to reduce the size and accuracy of the optical assemblies and/or optical elements that may be utilized.

Some optical assemblies may be designed to include a compound lens. A compound lens may be included in the optical assembly to compensate for one or more optical aberrations. Conventional compound lenses may be included in the optical assembly by arranging multiple discrete lens of different shapes and/or refractive indices together, such as in a barrel, housing, or frame, which in turn provides the alignment of the various lenses with respect to one another. However, the multiple lens used to form a conventional compound lens are typically provided as preformed lenses. Mating preformed lens together to form a compound lens may require precise alignment, which may complicate the assembly process. In addition, mounting discrete preformed lenses together to form a compound lens may increases the overall size of the optical assembly.

Accordingly, aspects of the present disclosure provide for a compound lens that is fabricated as a single monolithic structure. As will be described in more detail below, a compound lens that is fabricated as a single monolithic structure may increase the tolerance precision as compared to the conventional structures described above that include multiple discrete and pre-formed lenses being arranged together. In addition, a monolithic compound lens may eliminate the need for separate lenses to be included in the optical assembly, thus reducing the overall size.

Figure 2:
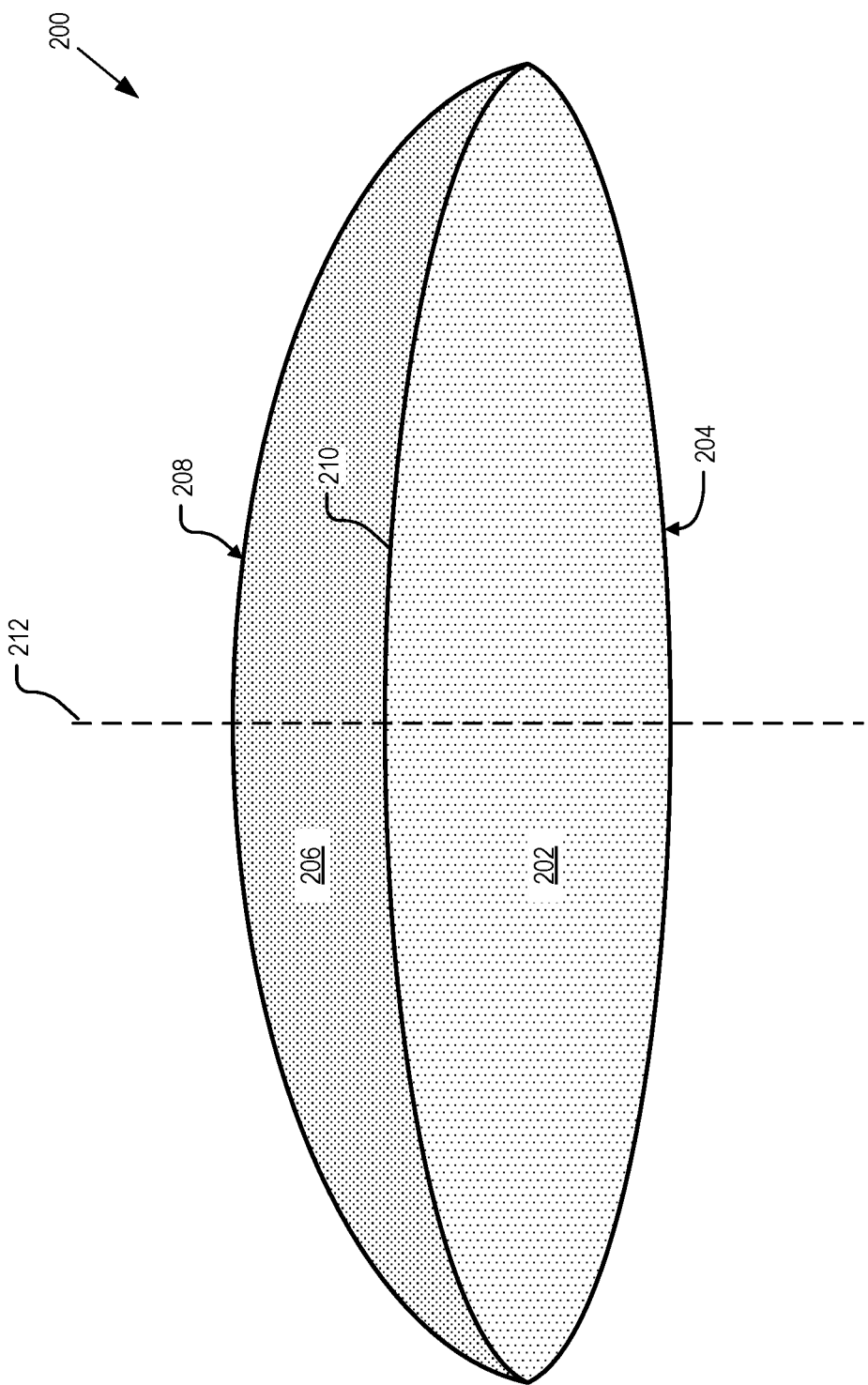
FIG. 2 illustrates an example monolithic compound lens, in accordance with aspects of the present disclosure.

By way of example, FIG. 2 illustrates sectional (i.e., side) view of an example monolithic compound lens 200, in accordance with aspects of the present disclosure. The illustrated example of lens 200 is shown as including a first region 202 that defines a first surface 204 of the lens 200 and a second region 206 that defines a second surface 208 of the lens 200, opposite the first surface 204. In some examples, the first surface 204 and the second surface 208 are the outermost surfaces of the lens 200. Lens 200 is one possible example of a near-eye optical element that may be incorporated into the optical assembly of the viewing structure 140 of FIG. 1. Lens 200 may also be one possible example of a small-diameter optical element that may be incorporated into the optical assembly that is utilized with the electronic component 145 of FIG. 1.

The first region 202 and the second region 206 of the lens 200 are formed from an optically-transmissive material, such as a polymer or resin. As will be described in more detail below, the first region 202 and the second region 206 may be fabricated as a single monolithic structure of optically-transmissive material such that an optical interface 210 is formed between the first region 202 and the second region 206. In some embodiments, the first region 202 may be configured to have a refractive index that is different from the refractive index of the second region 206. In some examples, the refractive indices of the first region 202 and the second region 206 are each in the range of about 1.4 to about 1.6. In some implementations, lens 200 may have a circular or round shape. However, in other examples, lens 200 may have a non-circular shape such as a square shape, oval shape, etc.

FIG. 2 illustrates the first surface 204 and the second surface 208 as each having a respective curvature. In some embodiments, the curvature of the first surface 204 is different from the curvature of the second surface 208. Although FIG. 2 illustrates both the first surface 204 and the second surface 208 as being convex, in other examples, each of the first surface 204 and/or the second surface 208 may be any of a convex, concave, or plano curvature. As further shown in FIG. 2, the optical interface 210 may also include a curvature, herein referred to as the optical interface curvature. The optical interface curvature may be different from the first curvature of the first surface 204 and/or the second curvature of the second surface 208. In addition, the optical interface curvature may be convex, concave, or plano. In some aspects, the term "curvature," as used herein, may refer to a surface profile of a lens. Thus, in some embodiments, the curvature of the first surface 204, the second surface 208, and/or the optical interface 210 are constant across the surface/interface such as may be present in a spherical lens. In other embodiments, one or more of the first surface 204, the second surface 208, and/or the optical interface 210 may be aspherical where their respective curvatures vary. By way of example, the optical interface 210 may have a "curvature" or surface profile that is concave-near-center and/or convex-near-outer edge.

In some embodiments, one or more of the first surface 204, the second surface 208, and the optical interface 210 may have a curvature that corresponds to the specifications of a user. In other words, the lens 200 may be a prescription lens.

As will be described in more detail below, the lens 200 may be fabricated by utilizing a multi-step molding and/or casting process of dispensing a liquid optically transmissive material into multiple mold cavities to form the first region 202 and the second region 206. The mold cavities may also be used to define the shape and curvature of the first surface 204, the second surface 208, and of the optical interface 210. In some examples, fabricating the lens 200 as a single monolithic structure allows for precise alignment between the first region 202 and the second region 206. For instance, FIG. 2 illustrates an optical axis 212 that is common to both the first region 202 and the second region 206. Fabricating the lens 200 as a single monolithic structure allows for the precise alignment of the first and second regions 202/206 with respect to the optical axis 212 without requiring the additional time consuming, expensive, and less accurate conventional processes of mating separate and discrete pre-formed lenses.

Figure 3:
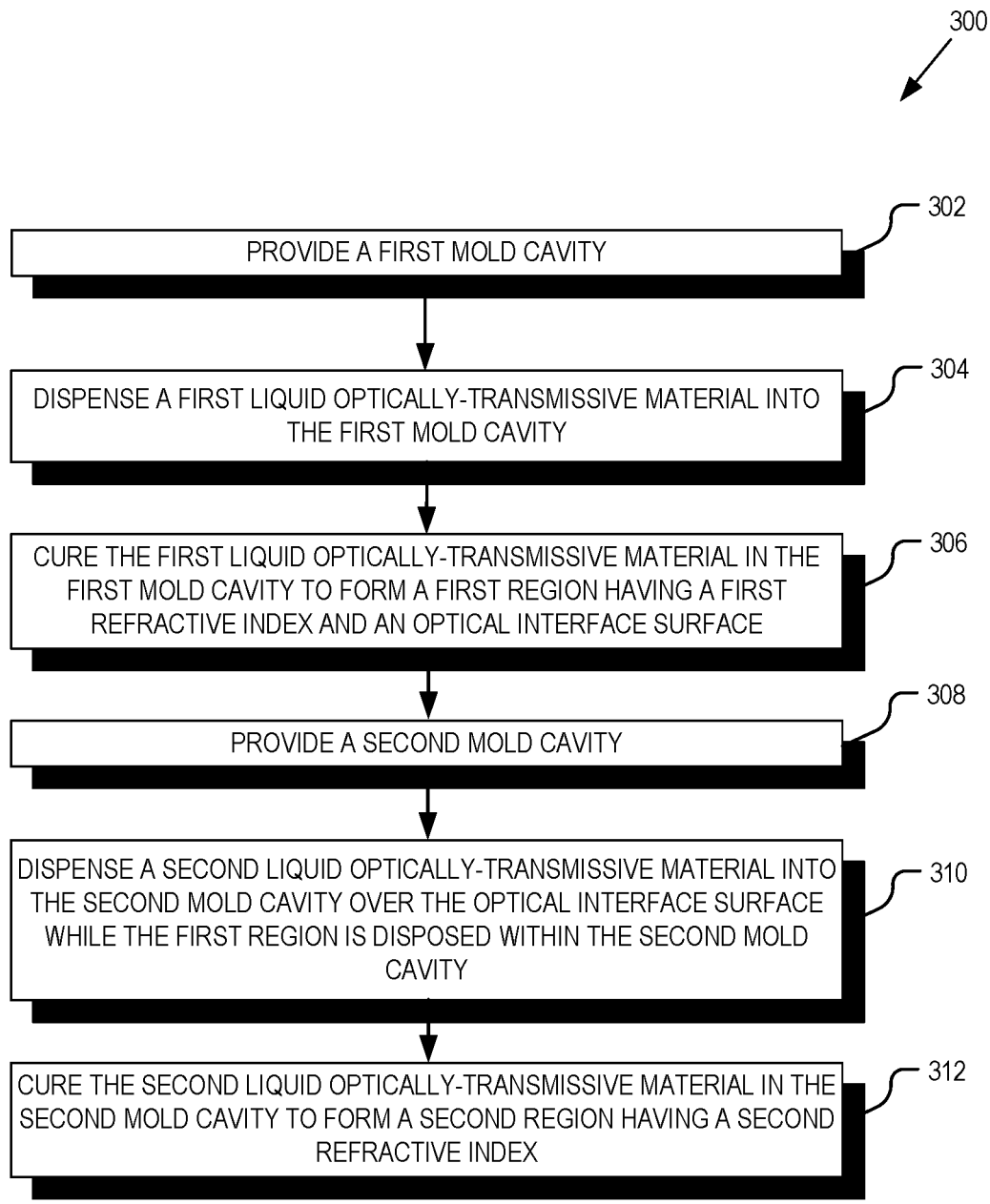
FIG. 3 is a flow chart illustrating an example process of fabricating a monolithic compound lens, in accordance with aspects of the present disclosure.

FIG. 3 is a flow chart illustrating an example process 300 of fabricating a monolithic compound lens, in accordance with aspects of the present disclosure. Process 300 is one possible process of fabricating lens 200 of FIG. 2, while FIGS. 4A-4F illustrate an example implementation of the process 300 of FIG. 3. Process 300 will be described with reference to both FIG. 3 and FIGS. 4A-4F, but in some examples, process 300 may be performed without one or more of the specific implementation details provided in FIGS. 4A-4F.

Process block 302 includes providing a first mold cavity. FIG. 4A illustrates the first mold cavity 402 that is provided by mating a first die 404 with a second die 406. As shown in FIG. 4A, the first die 404 includes a first lens-forming surface 408 and the second die 406 includes a second lens-forming surface 410 that, together, defines the first mold cavity 402.

Next, in process block 304, a first liquid optically-transmissive material 412 is dispensed into the first mold cavity 402 (e.g., see FIG. 4B). In some examples, the first liquid optically-transmissive material 412 is a curable material, such as a plastic, resin, poly-methyl methacrylate (PMMA), acrylic, or polymer. In some embodiments, dispensing the first liquid optically-transmissive material 412 is part of a casting process that includes pouring the first liquid optically-transmissive material 412 into the first mold cavity 402. In another embodiment, dispensing the first liquid optically-transmissive material 412 is part of an injection-molding process that includes injecting the first liquid optically-transmissive material 412 into the first mold cavity 402. In some implementations, the first die 404 and/or the second die 406 may be heated prior to dispensing the first liquid optically-transmissive material 412 into the first mold cavity 402.

In a process block 306, the first liquid optically-transmissive material 412 is then cured to form a first region 414 of a lens. As shown in FIG. 4B, the first region 414 of the lens has a first surface 416 that conforms to the first lens-forming surface 408 of the first die 404. The first region 414 also includes an optical interface surface 418 that conforms to the second lens-forming surface 410 of the second die 406. Curing the first liquid optically-transmissive material 412 includes transforming the material into a solid state to form the first region 414 of the lens. In some examples, process block 306 includes a thermal curing process, such as a fast-curing or a snap-curing process that includes the application of heat to the first liquid optically-transmissive material 412, either directly or via the first mold cavity 402. In other examples, the process involves cycling the temperature of the first mold cavity 402. For example, the first mold cavity 402 may be pre-heated as a hot polymer melt is injected into the first mold cavity 402, where the first mold cavity 402 is then actively cooled after the cavity has been filed. Only then is the part temperature reduced to the level required for curing. In some aspects, this process of cycling the temperature of the first mold cavity 402 may require less injection pressure and/or clamping force and may also reduce internal stress during injection. In yet another example, process block 306 includes an ultra-violet (UV) curing process that involves illuminating the first liquid optically-transmissive material 412 with UV light to initiate a photochemical reaction, where one or more of the first and second dies 404/406 are transmissive to UV light (e.g., second die 406 may be glass or other UV transparent material).

Next, in a process block 308, a second mold cavity is provided. The second mold cavity may be provided by removing the second die 406 to expose the optical interface surface 418 of the first region 414 (e.g., see FIG. 4C) and then mating a third die 420 with the first die 404 (e.g., see FIG. 4D). As shown in FIG. 4D, the third die 420 includes a third lens-forming surface 424, which when mated with the first die 404 defines the second mold cavity 422. In a process block 310, a second liquid optically-transmissive material 426 is dispensed into the second mold cavity 422 over the optical interface surface 418 while the first region 414 is disposed within the second mold cavity 422 (e.g., see FIG. 4E). Dispensing the second liquid optically-transmissive material 426 may include pouring the second liquid optically-transmissive material 426 into the second mold cavity 422 (e.g., casting) or it may include injecting the second liquid optically-transmissive material 426 (e.g., injection molding). In some implementations, the first die 404 and/or the third die 420 may be heated prior to dispensing the second liquid optically-transmissive material 426 into the second mold cavity 422. In some implementations, the second liquid optically-transmissive material 426 may have different optical characteristics as compared to the first liquid optically-transmissive material 412, such as a different refractive index, different corresponding light wavelength or corresponding temperature for curing, or other difference.

Process block 312 then includes curing the second liquid optically-transmissive material 426 in the second mold cavity 422 to form a second region 428 of the lens. Similar to process block 306, discussed above, curing the second liquid optically-transmissive material 426 may include a thermal curing process that includes actively cooling one or more of the first and third dies 404/420. In other examples, curing the second liquid optically-transmissive material 426 may include a UV curing process where one or more of the first and third dies 404/420 are transmissive to UV light (e.g., third die 420 may be glass or other UV transparent material).

As shown in FIG. 4E, the second region 428 is configured to define a second surface 430 of the lens that conforms to the third lens-forming surface 424 of the third die 420. FIG. 4F illustrates the resultant lens 432 removed from the first die 404 after the second region 428 has cured. As shown in FIG. 4F, lens 432 includes a first surface 416 provided by the first region 414, a second surface 430 provided by the second region 428, where an optical interface 434 between the first region 414 and the second region 428 conforms to the optical interface surface 418 (e.g., see optical interface surface 418 of FIG. 4C). As discussed above, the second liquid optically-transmissive material 426 may have different optical characteristics as compared to the first liquid optically-transmissive material 412. Thus, in some examples, the first region 414 may have a refractive index that is different from the refractive index of the second region 428. In some embodiments, the first surface 416, the second surface 430, and the optical interface 434 have the same curvature. However, in other examples, one or more of the first surface 416, the second surface 430, and the optical interface 434 may have a curvature that is different from one or more of the other curvatures.

Figure 5:
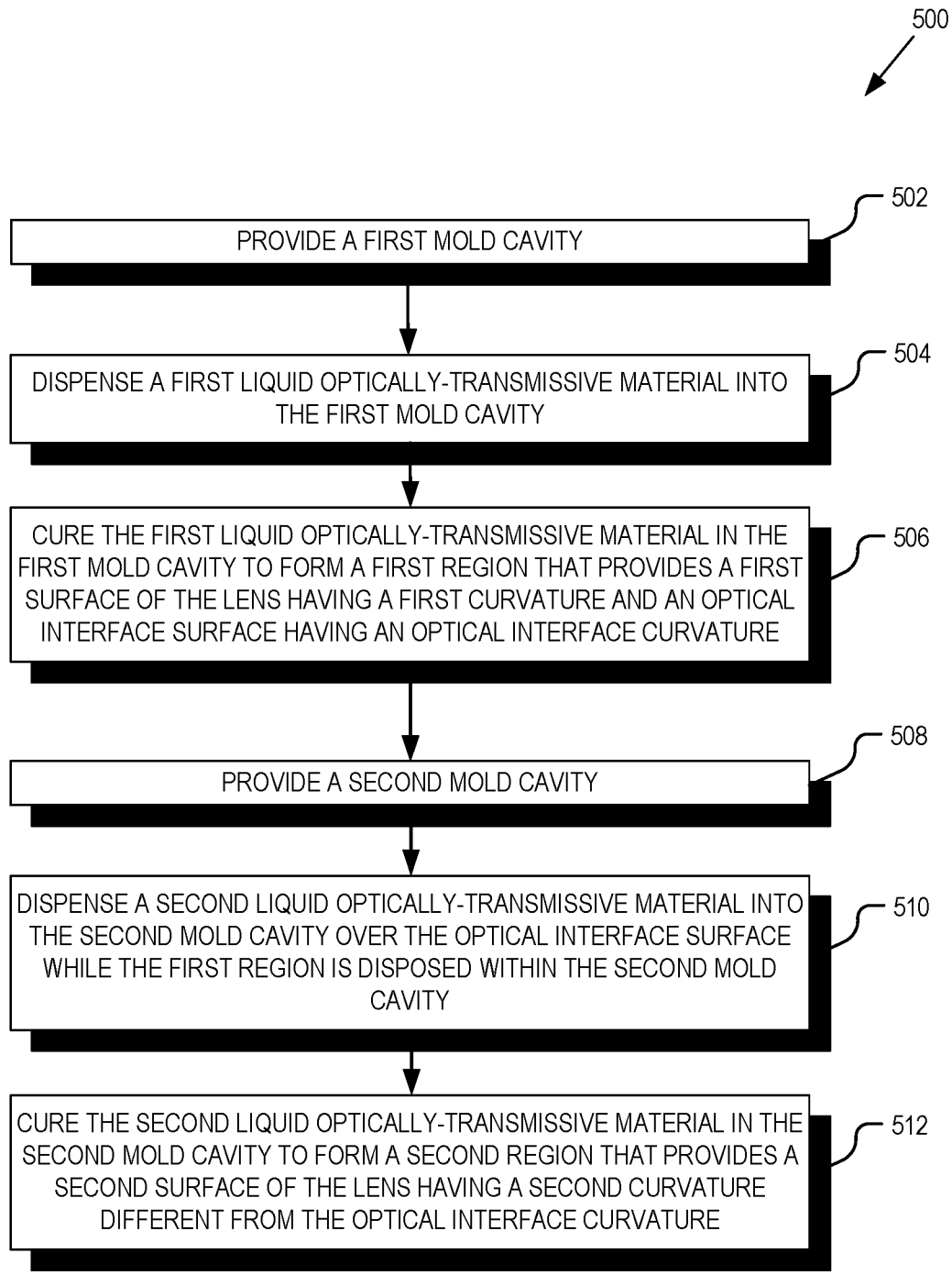
FIG. 5 is a flow chart illustrating an example process of fabricating a monolithic compound lens with differing curvatures, in accordance with aspects of the present disclosure.

By way of example, FIG. 5 is a flow chart illustrating an example process 500 of fabricating a monolithic compound lens with differing curvatures, in accordance with aspects of the present disclosure. Process 500 is one possible process of fabricating lens 200 of FIG. 2, while FIGS. 4A-4F illustrate an example implementation of the process 500 of FIG. 5. Process 500 will be described with reference to both FIG. 5 and FIGS. 4A-4F, but in some examples, process 500 may be performed without one or more of the specific implementation details provided in FIGS. 4A-4F.

Process block 502 includes providing a first mold cavity. FIG. 4A illustrates the first mold cavity 402 that is provided by mating a first die 404 with a second die 406. As shown in FIG. 4A, the first die 404 includes a first lens-forming surface 408 and the second die 406 includes a second lens-forming surface 410 that defines the first mold cavity 402. In some examples, the first lens-forming surface 408 has a curvature that is different from a curvature of the second lens-forming surface 410.

Next, in process block 504, a first liquid optically-transmissive material 412 is dispensed into the first mold cavity 402 (e.g., see FIG. 4B). Dispensing the first liquid optically-transmissive material 412 may include pouring the first liquid optically-transmissive material 412 into the first mold cavity 402 (e.g., casting) or it may include injecting the first liquid optically-transmissive material 412 (e.g., injection molding).

Process block 506 then includes curing the first liquid optically-transmissive material 412 in the first mold cavity 402 to form the first region 414 of a lens. Curing the first liquid optically-transmissive material 412 may include a thermal curing process and/or a UV curing process. As shown in FIG. 4B, the first region 414 may define a first surface 416 of the lens having a curvature that conforms to the curvature of the first lens-forming surface 408 of the first die 404. The first region 414 may also define an optical interface surface 418 that has a curvature that conforms to the second lens-forming surface 410 of the second die 406. Thus, in some examples, the curvature of the first surface 416 may be different from the curvature of the optical interface surface 418.

Next, in a process block 508, the second mold cavity 422 is provided. The second mold cavity 422 may be provided by removing the second die 406 to expose the optical interface surface 418 of the first region 414 (e.g., see FIG. 4C) and then mating a third die 420 with the first die 404 (e.g., see FIG. 4D). As shown in FIG. 4D, the third die 420 includes a third lens-forming surface 424, which when mated with the first die 404 defines the second mold cavity 422. In some examples, the third lens-forming surface 424 includes a curvature that differs from at least one of the curvatures of the first lens-forming surface 408 of the first die 404 or the second lens-forming surface 410 of the second die 406.

In a process block 510, a second liquid optically-transmissive material 426 is dispensed into the second mold cavity 422 over the optical interface surface 418 while the first region 414 is disposed within the second mold cavity 422 (e.g., see FIG. 4E). Dispensing the second liquid optically-transmissive material 426 may include pouring the second liquid optically-transmissive material 426 into the second mold cavity 422 (e.g., casting) or it may include injecting the second liquid optically-transmissive material 426 (e.g., injection molding). In some implementations, the first die 404 and/or the third die 420 may be heated prior to dispensing the second liquid optically-transmissive material 426 into the second mold cavity 422. In some implementations, the second liquid optically-transmissive material 426 may have different optical characteristics as compared to the first liquid optically-transmissive material 412, such as a different refractive index, different corresponding light wavelength or corresponding temperature for curing, or other difference.

Process block 512 then includes curing the second liquid optically-transmissive material 426 in the second mold cavity 422 to form a second region 428 of the lens. Similar to process block 506, discussed above, curing the second liquid optically-transmissive material 426 may include a thermal curing process that includes actively cooling one or more of the first and third dies 404/420. In other examples, curing the second liquid optically-transmissive material 426 may include a UV curing process where one or more of the first and third dies 404/420 are transmissive to UV light (e.g., third die 420 may be glass or other UV transparent material).

As shown in FIG. 4E, the second region 428 is configured to define a second surface 430 of the lens that conforms to the third lens-forming surface 424 of the third die 420. Thus, in some examples, a curvature of the second surface 430 may be different from at least one of the curvatures of the first surface 416 or the optical interface surface 418.

FIG. 4F illustrates the resultant lens 432 removed from the first die 404 after the second region 428 has cured. As shown in FIG. 4F, lens 432 includes a first surface 416 provided by the first region 414, a second surface 430 provided by the second region 428, where an optical interface 434 between the first region 414 and the second region 428 conforms to the optical interface surface 418 (e.g., see optical interface surface 418 of FIG. 4C). As discussed above, the second liquid optically-transmissive material 426 may have different optical characteristics as compared to the first liquid optically-transmissive material 412. Thus, in some examples, the first region 414 may have a refractive index that is different from the refractive index of the second region 428. Due to the differing curvatures of one or more of the lens-forming surfaces provided by the first, second, and third dies, one or more of the first surface 416, the second surface 430, and the optical interface 434 may have a curvature that is different from one or more of the other curvatures.

Figure 6:
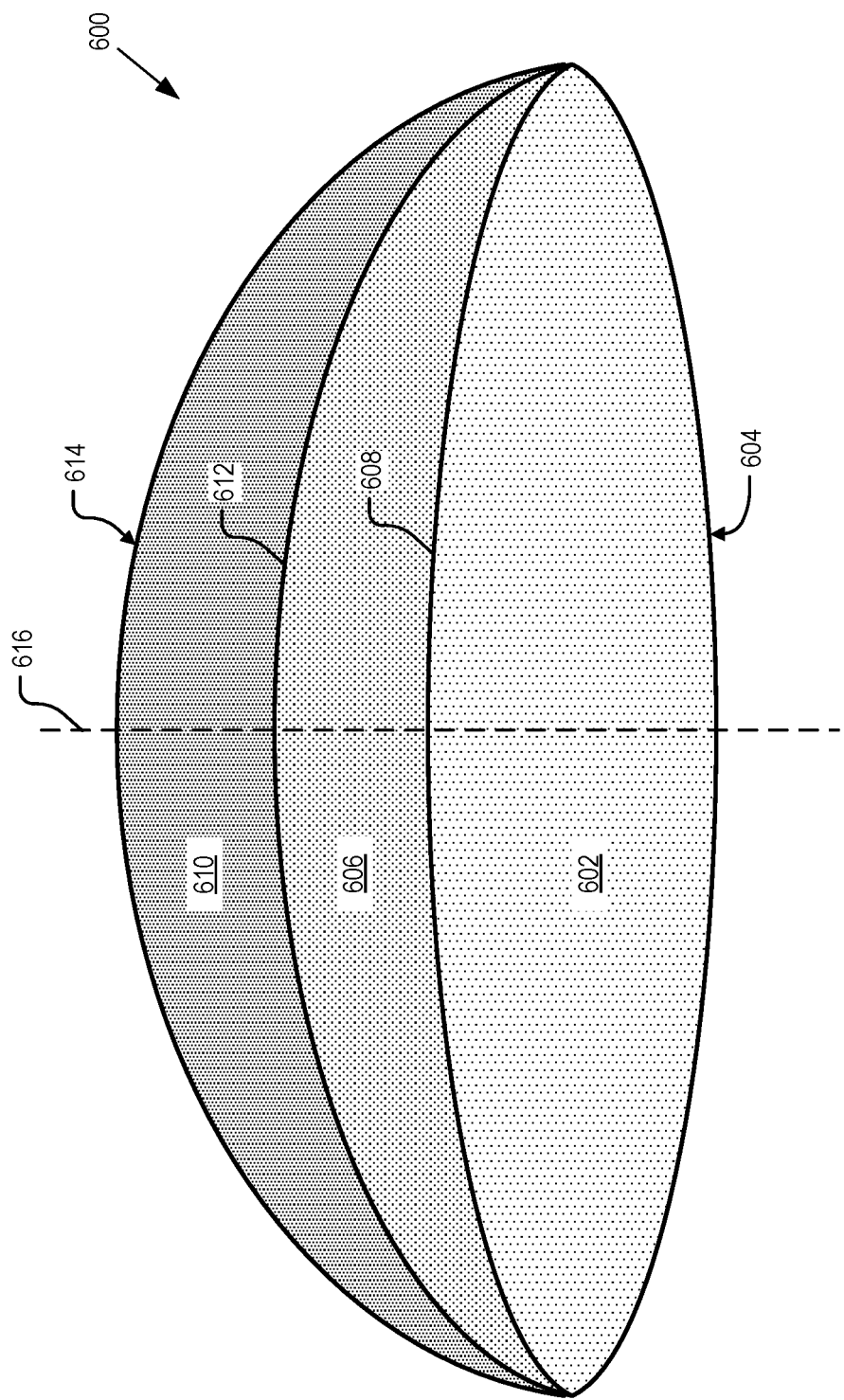
FIG. 6 illustrates an example monolithic compound lens having more than two regions of optically transmissive material, in accordance with aspects of the present disclosure.

The example lenses 200 of FIG. 2 and 432 of FIG. 4F are illustrated as compound lenses that include two regions of optically transmissive material. In some examples, lens 200 and 432 may be referred to as doublet-type lenses due to the fact that they include two regions of differing refractive indices. However, embodiments of the present disclosure may include monolithic compound lenses that include any number of regions including two or more. By way of example, FIG. 6 illustrates a sectional (i.e., side) view of an example monolithic compound lens 600 having more than two regions of optically transmissive material, in accordance with aspects of the present disclosure. Specifically, lens 600 is shown as including three regions and may be referred to as a triplet-type compound lens.

The illustrated example of lens 600 is shown as including a first region 602 that defines a first surface 604 of the lens 600, a second region 606, and a third region 610 that defines a second surface 614 of the lens 600, opposite the first surface 604. In some examples, the first surface 604 and the second surface 614 are the outermost surfaces of the lens 600. Lens 600 is one possible example of a near-eye optical element that may be incorporated into the optical assembly of the viewing structure 140 of FIG. 1. Lens 600 may also be one possible example of a small-diameter optical element that may be incorporated into the optical assembly that is utilized with the electronic component 145 of FIG. 1.

The first region 602, the second region 606, and the third region 610 of the lens 600 are formed from optically-transmissive material, such as a polymer or resin. The first region 602, the second region 606, and the third region 610, together, may be fabricated as a single monolithic structure of optically-transmissive material such that a first optical interface 608 is formed between the first region 602 and the second region 606, and a second optical interface 612 is formed between the second region 606 and the third region 610. In some embodiments, the first region 602 may be configured to have a refractive index that is different from the refractive index of the second region 606. In addition, the second region 606 may have a refractive index that is different from that of the third region 610. In some examples, the refractive indices of the first region 602, the second region 606, and the third region 610 are each in the range of about 1.4 to about 1.6.

FIG. 6 illustrates the first surface 604 and the second surface 614 as each having a respective curvature. In some embodiments, the curvature of the first surface 604 is different from the curvature of the second surface 614. Although FIG. 6 illustrates both the first surface 604 and the second surface 614 as being convex, in other examples, each of the first surface 604 and/or the second surface 614 may be any of a convex, concave, or plano curvature. As further shown in FIG. 6, the optical interfaces 608 and 612 may also include a respective optical interface curvature. The optical interface curvatures of optical interfaces 608 and 612 may be different from one another, as well as from the curvatures of the first surface and second surfaces 604/614. In addition, the optical interface curvatures of the optical interfaces 608 and 612 may be convex, concave, or plano. In some embodiments, one or more of the first surface 604, the second surface 614, the first optical interface 608, and the second optical interface 612 may have a curvature that corresponds to the specifications of a user. In other words, the lens 600 may be a prescription lens.

In some embodiments, the curvature of the first surface 604, the second surface 614, the first optical interface 608, and/or the second optical interface 612 are constant across their respective surface/interfaces such as may be present in a spherical lens. In other embodiments, one or more of the first surface 604, the second surface 614, the first optical interface 608, and/or the second optical interface 612 may be aspherical where their respective curvatures vary. By way of example, the first optical interface 608 may have a "curvature" or surface profile that is concave-near-center and/or convex-near-outer edge.

FIG. 6 also illustrates an optical axis 616 that is common to the first region 602, the second region 606, and the third region 610. Fabricating the lens 600 as a single monolithic structure allows for the precise alignment of the first, second, and third regions 602/606/610 with respect to the optical axis 616 without requiring the additional time consuming, expensive, and less accurate conventional processes of mating separate and discrete pre-formed lenses.

Figure 7:
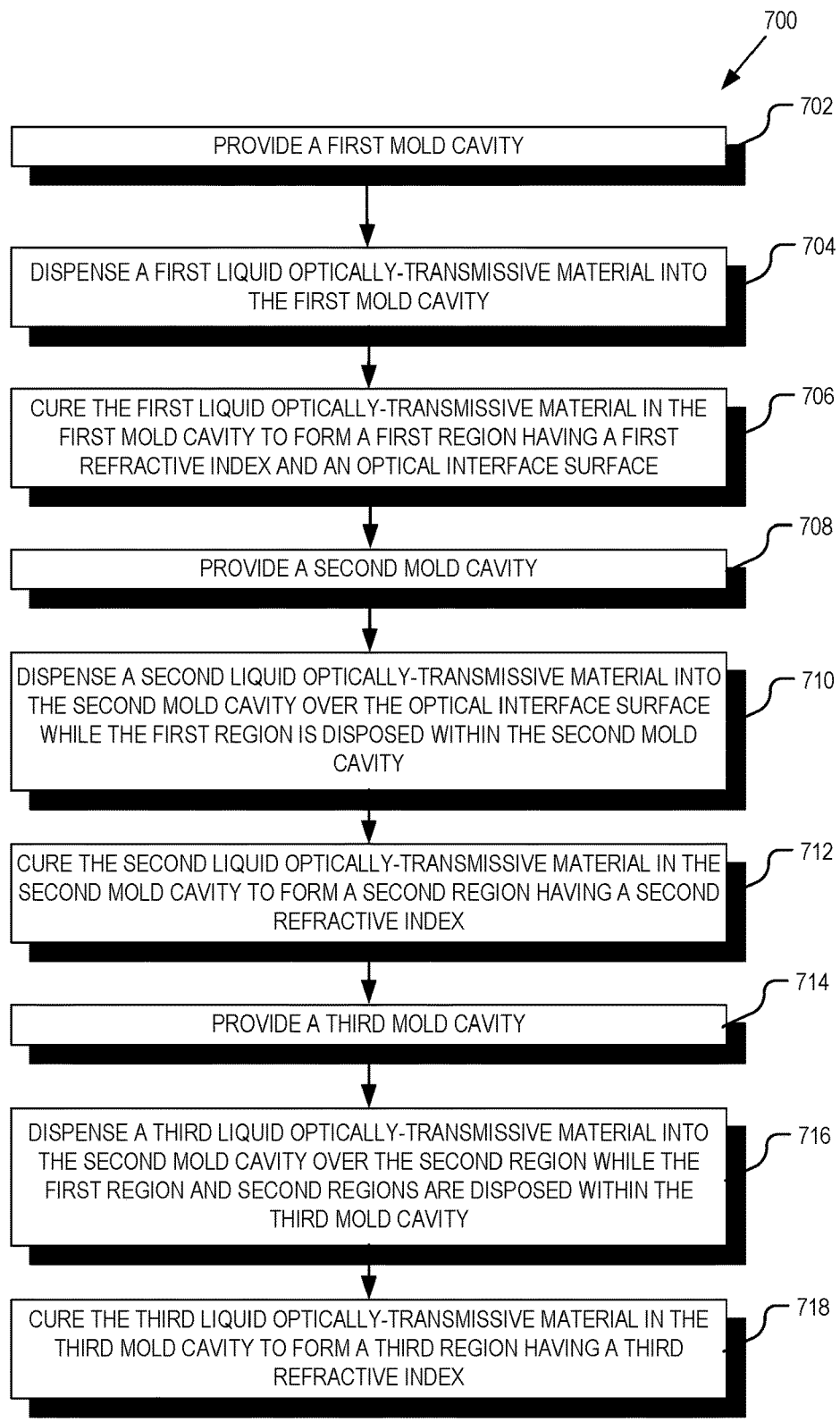
FIG. 7 is a flow chart illustrating an example process of fabricating a monolithic compound lens having more than two regions of optically transmissive material, in accordance with aspects of the present disclosure.

FIG. 7 is a flow chart illustrating an example process 700 of fabricating a monolithic compound lens having more than two regions of optically transmissive material, in accordance with aspects of the present disclosure. Process 700 is one possible process of fabricating lens 600 of FIG. 6, while FIGS. 8A-8I illustrate an example implementation of the process 700 of FIG. 7. Process 700 will be described with reference to both FIG. 7 and FIGS. 8A-8I, but in some examples, process 700 may be performed without one or more of the specific implementation details provided in FIGS. 8A-8I.

Process block 702 includes providing a first mold cavity. FIG. 8A illustrates the first mold cavity 802 that is provided by mating a first die 804 with a second die 806. As shown in FIG. 8A, the first die 804 includes a first lens-forming surface 808 and the second die 806 includes a second lens-forming surface 810 that defines the first mold cavity 802.

Next, in process block 704, a first liquid optically-transmissive material 812 is dispensed into the first mold cavity 802 (e.g., see FIG. 8B). In some examples, the first liquid optically-transmissive material 812 is a curable material, such as a plastic, resin, poly-methyl methacrylate (PMMA), acrylic, or polymer. In some embodiments, dispensing the first liquid optically-transmissive material 812 is part of a casting process that includes pouring the first liquid optically-transmissive material 812 into the first mold cavity 802. In another embodiment, dispensing the first liquid optically-transmissive material 812 is part of an injection-molding process that includes injecting the first liquid optically-transmissive material 812 into the first mold cavity 802. In some implementations, the first die 804 and/or the second die 806 may be heated prior to dispensing the first liquid optically-transmissive material 812 into the first mold cavity 802.

In a process block 706, the first liquid optically-transmissive material 812 is then cured to form a first region 814 of a lens. As shown in FIG. 8B, the first region 814 of the lens has a first surface 816 that conforms to the first lens-forming surface 808 of the first die 804. The first region 814 also includes a first optical interface surface 818 that conforms to the second lens-forming surface 810 of the second die 806. Curing the first liquid optically-transmissive material 812 includes transforming the material into a solid state to form the first region 814 of the lens. In some examples, process block 706 includes a thermal curing process, such as a fast-curing or a snap-curing process that includes the application of heat to the first liquid optically-transmissive material 812, either directly or via the first mold cavity 802. In other examples, the process involves cycling the temperature of the first mold cavity 802. For example, the first mold cavity 802 may be pre-heated as a hot polymer melt is injected into the first mold cavity 802, where the first mold cavity 802 is then actively cooled after the cavity has been filed. Only then is the part temperature reduced to the level required for curing. In some aspects, this process of cycling the temperature of the first mold cavity 802 may require less injection pressure and/or clamping force and may also reduce internal stress during injection. In yet another example, process block 706 includes an ultra-violet (UV) curing process that involves illuminating the first liquid optically-transmissive material 812 with UV light to initiate a photochemical reaction, where one or more of the first and second dies 804/806 are transmissive to UV light (e.g., second die 806 may be glass or other UV transparent material).

Next, in a process block 708, a second mold cavity is provided. The second mold cavity may be provided by removing the second die 806 to expose the first optical interface surface 818 of the first region 814 (e.g., see FIG. 8C) and then mating a third die 820 with the first die 804 (e.g., see FIG. 8D). As shown in FIG. 8D, the third die 820 includes a third lens-forming surface 824, which when mated with the first die 804 defines the second mold cavity 822. In a process block 710, a second liquid optically-transmissive material 826 is dispensed into the second mold cavity 822 over the first optical interface surface 818 while the first region 814 is disposed within the second mold cavity 822 (e.g., see FIG. 8E). Dispensing the second liquid optically-transmissive material 826 may include pouring the second liquid optically-transmissive material 826 into the second mold cavity 822 (e.g., casting) or it may include injecting the second liquid optically-transmissive material 826 (e.g., injection molding). In some implementations, the first die 804 and/or the third die 820 may be heated prior to dispensing the second liquid optically-transmissive material 826 into the second mold cavity 822. In some implementations, the second liquid optically-transmissive material 826 may have different optical characteristics as compared to the first liquid optically-transmissive material 812, such as a different refractive index, different corresponding light wavelength or corresponding temperature for curing, or other difference.

Process block 712 then includes curing the second liquid optically-transmissive material 826 in the second mold cavity 822 to form a second region 828 of the lens. Similar to process block 706, discussed above, curing the second liquid optically-transmissive material 826 may include a thermal curing process that includes actively cooling one or more of the first and third dies 804/820. In other examples, curing the second liquid optically-transmissive material 826 may include a UV curing process where one or more of the first and third dies 804/820 are transmissive to UV light (e.g., third die 820 may be glass or other UV transparent material).

As shown in FIG. 8E, the second region 828 is configured to define a second optical interface surface 830 that conforms to the third lens-forming surface 824 of the third die 820.

Figure 8I:
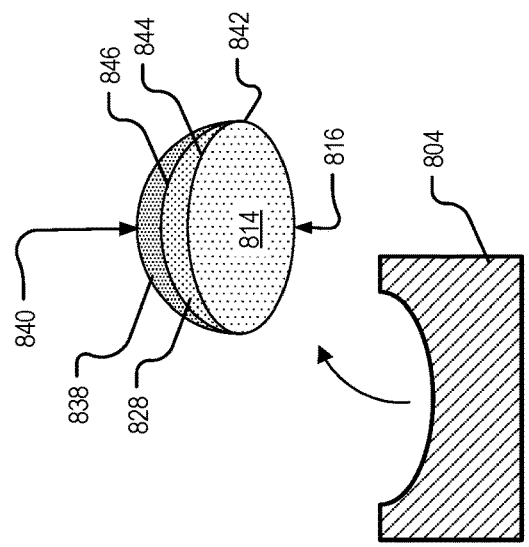

Next, in process block 714, a third mold cavity is provided. The third mold cavity may be provided by removing the third die 820 to expose the second optical interface surface 830 of the second region 828 (e.g., see FIG. 8F) and then mating a fourth die 832 with the first die 804 (e.g., see FIG. 8G). As shown in FIG. 8G, the fourth die 932 includes a fourth lens-forming surface 835, which when mated with the first die 804 defines the third mold cavity 834. In a process block 716, a third liquid optically-transmissive material 836 is dispensed into the third mold cavity 834 over the second optical interface surface 830 while the first region 814 and second region 828 are disposed within the third mold cavity 834 (e.g., see FIG. 8H). Dispensing the third liquid optically-transmissive material 836 may include pouring the third liquid optically-transmissive material 836 into the third mold cavity 834 (e.g., casting) or it may include injecting the third liquid optically-transmissive material 836 (e.g., injection molding). In some implementations, the first die 804 and/or the fourth die 832 may be heated prior to dispensing the third liquid optically-transmissive material 836 into the third mold cavity 834. In some implementations, the third liquid optically-transmissive material 836 may have different optical characteristics as compared to the second liquid optically-transmissive material 826, such as a different refractive index, different corresponding light wavelength or corresponding temperature for curing, or other difference.

Process block 718 then includes curing the third liquid optically-transmissive material 836 in the third mold cavity 834 to form a third region 838 of the lens. Similar to process block 706, discussed above, curing the third liquid optically-transmissive material 836 may include a thermal curing process that includes actively cooling one or more of the first and fourth dies 804/832. In other examples, curing the third liquid optically-transmissive material 836 may include a UV curing process where one or more of the first and fourth dies 804/832 are transmissive to UV light (e.g., fourth die 832 may be glass or other UV transparent material).

Figure 8H:
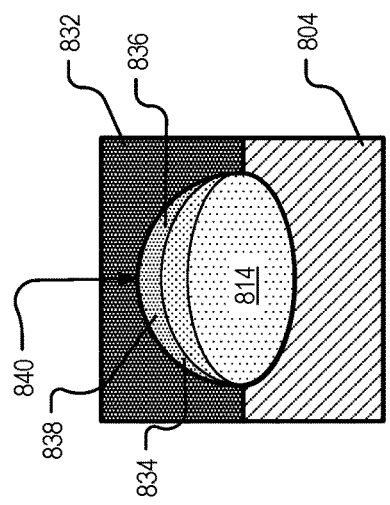
Figure 8G:
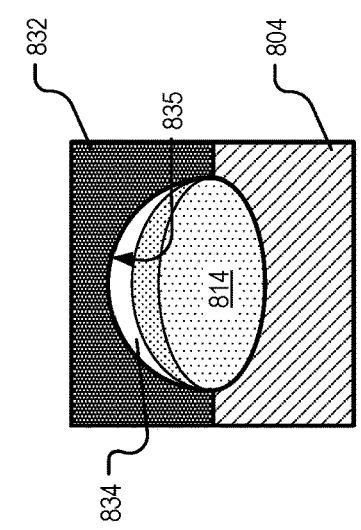

As shown in FIG. 8H, the third region 838 is configured to define a second surface 840 of the lens that conforms to the fourth lens-forming surface 835 of the fourth die 832.

FIG. 8I illustrates the resultant lens 842 removed from the first die 804 after the third region 838 has cured. As shown in FIG. 8I, lens 842 includes a first surface 816 provided by the first region 814, a second surface 840 provided by the third region 838, where a first optical interface 844 between the first region 814 and the second region 828 conforms to the first optical interface surface 818 (e.g., see first optical interface surface 818 of FIG. 8C), and where a second optical interface 846 between the second region 828 and the third region 838 conforms to the second optical interface surface 830 (e.g., see second optical interface surface 830 of FIG. 8F). As discussed above, the liquid optically-transmissive material used to form the various regions of the lens 842 may have differing optical characteristics with respect to one another. Thus, in some examples, the first region 814 may have a refractive index that is different from the refractive index of the second region 828. In addition, the second region 828 may have a refractive index that is different from the refractive index of third region 838. In some embodiments, the first surface 816, the second surface 840, the first optical interface 844, and the second optical interface 846 have the same curvature. However, in other examples, one or more of the first surface 816, the second surface 840, the first optical interface 844, or the second optical interface 846 may have a curvature that is different from one or more of the other curvatures.

The order in which some or all of the process blocks appear in each process 300, 500, and 700, described above should not be deemed limiting. Rather, one of ordinary skill in the art having the benefit of the present disclosure will understand that some of the process blocks may be executed in a variety of orders not illustrated.

Embodiments of the invention may include or be implemented in conjunction with the manufacture of an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of fabricating a lens, the method comprising:
providing a first mold cavity;
dispensing a first liquid optically-transmissive material into the first mold cavity;
curing the first liquid optically-transmissive material in the first mold cavity to form a first region of the lens having a first refractive index, wherein the first region includes an optical interface surface;
providing a second mold cavity;
dispensing a second liquid optically-transmissive material into the second mold cavity over the optical interface surface while the first region of the lens is disposed within the second mold cavity; and
curing the second liquid optically-transmissive material in the second mold cavity to form a second region of the lens having a second refractive index, wherein an optical interface between the first region and the second region conforms to the optical interface surface, wherein providing the first mold cavity comprises mating a first die with a second die to define the first mold cavity, and wherein providing the second mold cavity includes:
removing the second die to expose the optical interface surface of the first region; and
mating a third die with the first die to define the second mold cavity.

2. The method of claim 1, wherein the first die includes a first lens-forming surface to form a first surface of the lens, and the second die includes a second lens-forming surface to form the optical interface surface.

3. The method of claim 2, wherein the third die includes a third lens-forming surface to form a second surface of the lens, opposite the first surface.

4. The method of claim 3, wherein the optical interface surface has a first curvature that conforms to a curvature of the second lens-forming surface, wherein the second surface of the lens has a second curvature that conforms to a curvature of the third lens-forming surface, and wherein the first curvature is different from the second curvature.

5. The method of claim 1, wherein dispensing and curing the first liquid optically-transmissive material comprises a thermal curing process that includes heating the first mold cavity.

6. The method of claim 5, wherein the thermal curing process of claim 5 comprises a first thermal curing process and wherein dispensing and curing the second liquid optically-transmissive material comprises a second thermal curing process that includes heating the second mold cavity.

7. The method of claim 6, wherein at least one of the first liquid optically-transmissive material or the second liquid optically-transmissive material comprises a polymer or a resin.

8. The method of claim 5, wherein curing the second liquid optically-transmissive material comprises an ultraviolet (UV) curing process that includes illuminating the second liquid optically-transmissive material with UV light.

9. The method of claim 8, wherein at least one of the first mold cavity or the second mold cavity are transparent to the UV light.

10. A method of fabricating a lens, the method comprising:
providing a first mold cavity;
dispensing a first liquid optically-transmissive material into the first mold cavity;
curing the first liquid optically-transmissive material in the first mold cavity to form a first region of the lens, wherein the first region provides a first surface of the lens and an optical interface surface, wherein the first surface includes a first curvature and the optical interface surface includes an optical interface curvature;
providing a second mold cavity;
dispensing a second liquid optically-transmissive material into the second mold cavity over the optical interface surface while the first region is disposed within the second mold cavity; and
curing the second liquid optically-transmissive material in the second mold cavity to form a second region of the lens, wherein the second region provides a second surface of the lens that includes a second curvature that is different from the optical interface curvature, wherein an optical interface between the first region and the second region conforms to the optical interface curvature of the optical interface surface, wherein providing the first mold cavity comprises mating a first die with a second die to define the first mold cavity, and wherein providing the second mold cavity comprises:
removing the second die to expose the optical interface surface of the first region; and
mating a third die with the first die to define the second mold cavity.

11. The method of claim 10, wherein the first die includes a first lens-forming surface to form the first surface of the lens, and the second die includes a second lens-forming surface to form the optical interface surface.

12. The method of claim 11, wherein the third die includes a third lens-forming surface to form the second surface of the lens, opposite the first surface.

13. The method of claim 10, wherein dispensing and curing at least one of the first liquid optically-transmissive material or the second liquid optically-transmissive material comprises a thermal curing process that includes heating at least one of the first mold cavity or the second mold cavity.

14. The method of claim 10, wherein curing at least one of the first liquid optically-transmissive material or the second liquid optically-transmissive material comprises an ultraviolet (UV) curing process that includes illuminating the first or the second liquid optically-transmissive material with UV light.

* * * * *